United States Patent [19]

Korson et al.

[11] Patent Number: 4,946,178
[45] Date of Patent: Aug. 7, 1990

[54] CHUCK AND METHOD OF CHUCKING

[76] Inventors: John A. Korson, Box 21 Rte. 1, Lake Leelanau, Mich. 49653; Bruce W. Korson, Box 463, Rte. 1, Suttons Bay, Mich. 49682

[21] Appl. No.: 415,607

[22] Filed: Oct. 2, 1989

[51] Int. Cl.$^5$ ............................................. B23B 31/02
[52] U.S. Cl. .................... 279/1 R; 279/1 J; 279/35; 279/106
[58] Field of Search ............ 279/1 R, 1 J, 1 S, 1 DC, 279/1 ME, 1 DA, 1 TE, 4, 33, 35, 106, 6

[56] References Cited

U.S. PATENT DOCUMENTS

| | | | |
|---|---|---|---|
| 1,812,006 | 6/1931 | Jellicoe | 279/1 DA |
| 1,819,837 | 8/1931 | De Graff | 279/106 |
| 1,864,191 | 6/1932 | Eidam | 279/1 R X |
| 4,251,605 | 8/1980 | Toth et al. | 279/33 |
| 4,467,681 | 8/1984 | Oeming | 279/1 DC |

FOREIGN PATENT DOCUMENTS

| | | | |
|---|---|---|---|
| 422198 | 1/1925 | Fed. Rep. of Germany | 279/33 |
| 108561 | of 1893 | United Kingdom | 279/33 |

Primary Examiner—William Briggs
Attorney, Agent, or Firm—Charles M. Kaplan

[57] ABSTRACT

A chuck and methods of chucking or clamping a workpiece for multiple machining operations without requiring rechucking or repositioning of the workpiece employs an arcuate cradle for supporting the workpiece with an abuttment at one of its ends. The workpiece is slid along the cradle until one of its ends is stopped by the abuttment, and then a jaw is pivoted against the other end of the workpiece to securely clamp the workpiece under hydraulic force derived from a machining tool to which the chuck is attached.

21 Claims, 2 Drawing Sheets

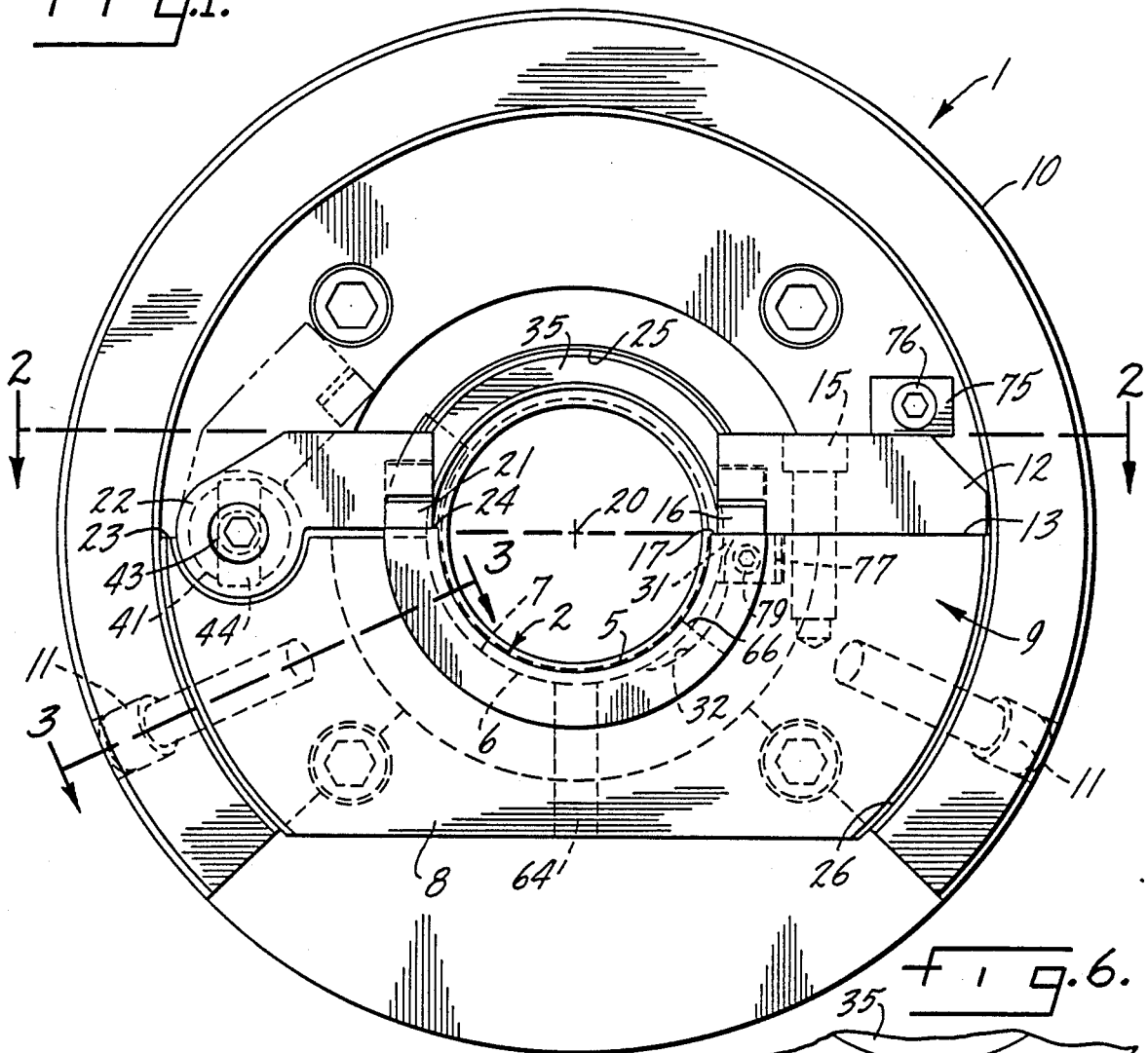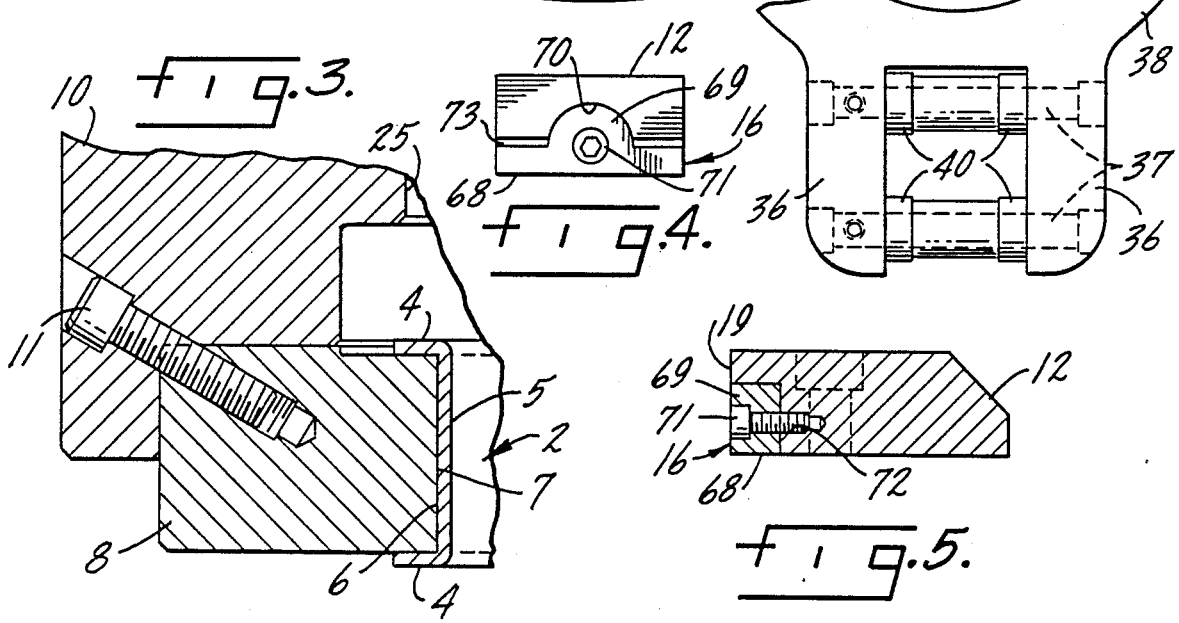

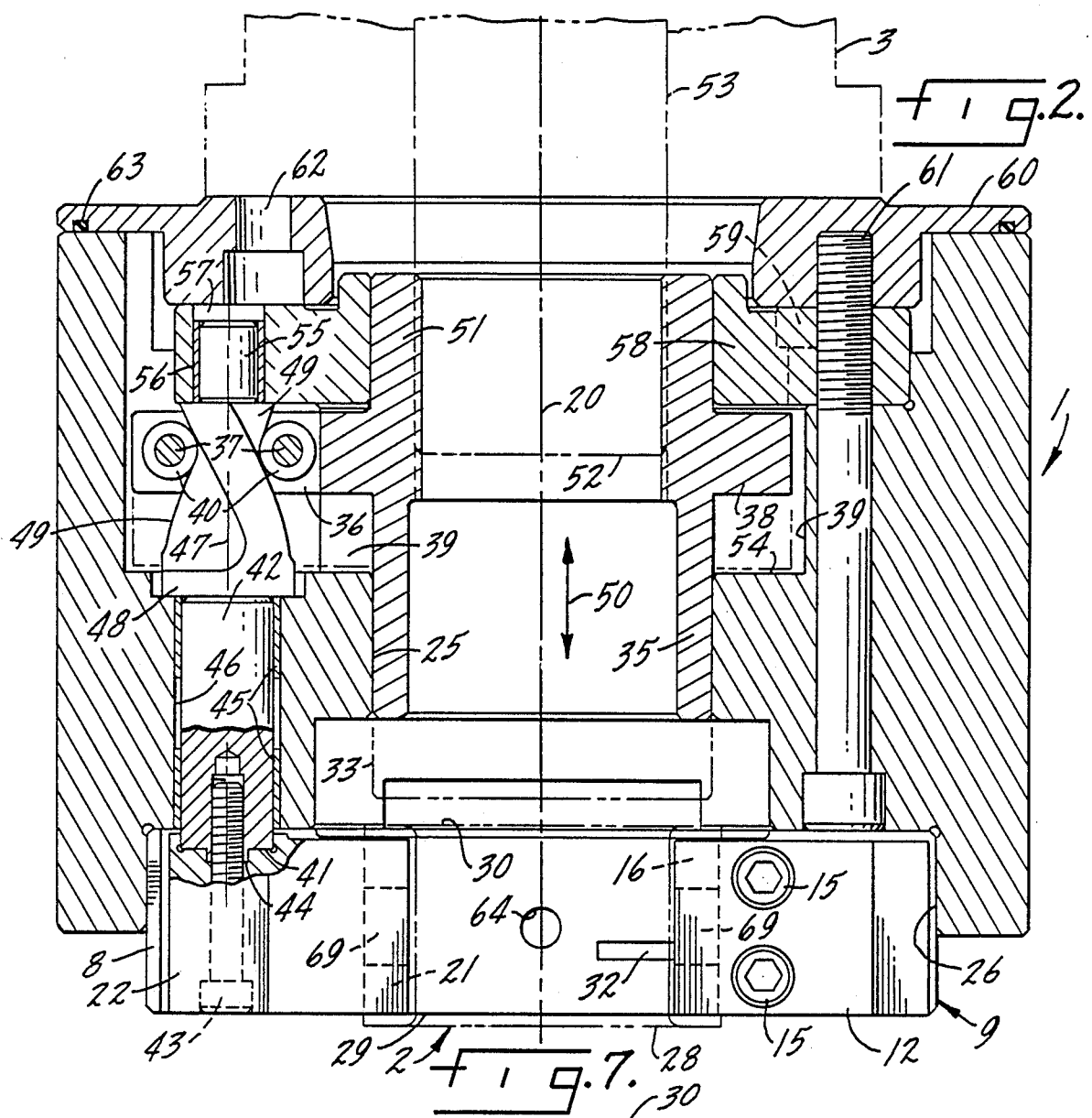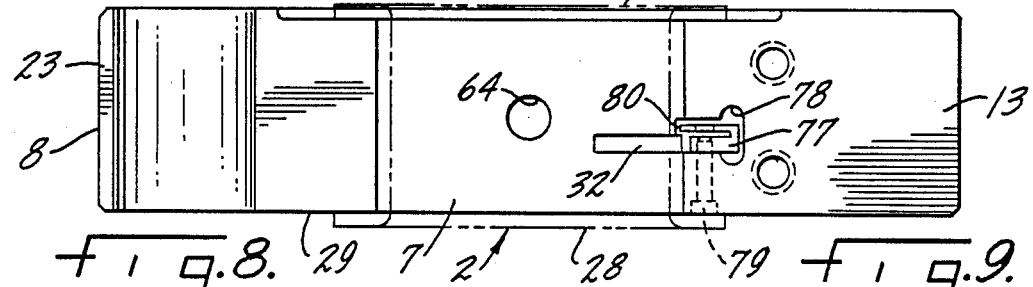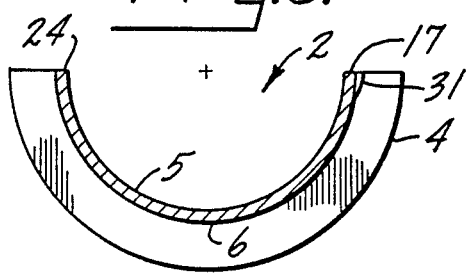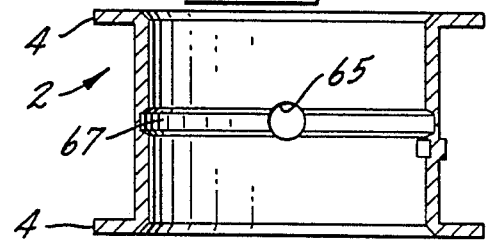

CHUCK AND METHOD OF CHUCKING

BACKGROUND OF THE INVENTION

Our invention relates to the holding during machining operations of workpieces that include surfaces shaped like circular arcs, and more particularly to chucks and methods of clamping or chucking for circular arcuate workpieces that are less than 360 degrees in circumferential extent but that are not equal to 180 degrees.

Simple mechanisms are available for holding workpieces that are circular, and workpieces that have portions that are circular arcs equal to 180 degrees can be placed in an opposed mating relationship that permits them also to be held by simple mechanisms. However, when a workpiece essentially is shaped like a circular arc that is less than 360 degrees but is not equal to 180 degrees, such simple mechanisms can not be employed for accurate and close tolerance machining operations. In particular, when such a workpiece is a concave circular arcuate bearing that must be chucked for machining by rotation at high speed on a lathe, prior art chucks and methods of chucking are deficient.

OBJECTIVES OF THE INVENTION

Accordingly, it is an object of our invention to provide improved chucks and methods of chucking.

Another object is to provide chucks and methods of chucking workpieces that are shaped like concave circular arc segments that are substantially less than 360 degrees in circumferential extent.

Another object is to reduce machining down time by reducing the number of times a workpiece has to be re-chucked for multiple machining operations.

Another object is to provide hydraulically actuated chucks for holding circular arcuate workpieces during mass production operations that are fast acting and employ direct positive gripping forces.

Another object is to provide chucks and methods of chucking that permit several machining operations to be performed on a workpiece without requiring that the workpiece be positioned or rechucked.

Another object is to provide chucks that do not bend or distort circular arcuate workpieces.

Another object is to provide chucks that expose for machining the opposite surfaces of a workpiece shaped like a circular arc segment.

Another object is to provide chucks and methods of chucking circular arc bearing segments for machining on lathes or on machining centers.

Another object is to provide chucks that clamp a bearing half segment in one chucking operation that enable the bearing segment to be accurately located for boring, to have opposed circumferential edges chamfered, to have an oil groove machined in its concave surface, and to have oil access holes bored in it, without having to adjust or rechuck the bearing segment.

Another object is to provide relatively simple and low cost, durable, easily maintained, accurate chucks and chucking methods that can be used for righthand or lefthand high speed machining operations and which do not possess defects found in similar prior art devices and methods.

Another object is to provide a chuck jaw for securely clamping the ends of an arcuate workpiece even though such ends may be irregular or misaligned.

Other objects and advantages of our invention will be found in the specification and claims, and the scope of the invention will be set forth in the claims.

DESCRIPTION OF THE DRAWING

FIG. 1 is an end view of an embodiment of our invention.

FIG. 2 is a cross sectional view taken along the line 2—2 in FIG. 1

FIG. 3 is a cross sectional view taken along the line 3—3 in FIG. 1

FIG. 4 is an end view of a stop member in accord with our invention.

FIG. 5 is a cross sectional view of the stop member shown in FIG. 4

FIG. 6 is an end view of a portion of an actuator in accord with our invention.

FIG. 7 is a top view of a cradle portion in accord with our invention.

FIG. 8 is a cross sectional view of a workpiece of the type held by our invention.

FIG. 9 is a top view of a finished workpiece of the type held by our invention.

DESCRIPTION OF THE INVENTION

The drawing shows a chuck 1 in accord with our invention for holding a workpiece 2 during a machining operation on a machine tool, such as a conventional lathe having a spindle 3. As shown in the drawing, workpiece 2 is an automative bearing half which is shaped like a segment of a circular arc that is substantially less than 360 degrees. Workpiece 2 may include a flange 4 on each side and the workpiece has a concave surface 5 and a convex surface 6. The workpiece has a circumferential arcuate length or extent slightly greater than 180 degrees, which permits its ends to be machined down during a final operation to a final predetermined circumferential length and that may be closer to or less than 180 degrees. Convex surface 6 is supported by the mating concave circular arcuate surface 7 of a chuck cradle portion 8, and the flanges 4 overlap the edges on each side of the cradle. Cradle portion 8 is part of a removable jaw assembly 9 that is attached to chuck body 10 by bolts 11, and jaw 9 may be removed and replaced by other jaws having different cradle portions dimensioned to mate with similar but differently dimensioned workpieces. A stop member 12 is attached at one end 13 of cradle portion 8 by bolts 15 and has a rotatable or pivoting pad 16 for abutting against one end 17 of the workpiece when the workpiece is supported by arcuate surface 7. The inner end 19 of stop member 12 extends generally radially of arcuate surface 7 toward the central axis 20 of the chuck. A pivotable jaw 22 adjacent the other end 23 of cradle portion 8 clamps against the other end 24 of the workpiece when the workpiece is supported by arcuate surface 7. Jaw 22 also has a rotatable or pivoting pad 21 for contacting end 24, and pads 16 and 21 accomodate irregularities and misalignment in workpiece ends 17 and 24.

A center bore 25 extends completely through chuck body 10, and at one end of body 10, bore 25 is enlarged to define a circular groove 26 adjacent arcuate surface 7. Groove 26 has a larger diameter than both arcuate surface 7 and workpiece 2 for receiving cradle 8. One edge 28 of the workpiece extends beyond the terminal edge 29 of the chuck while the opposite edge 30 of the workpiece extends beyond arcuate surface 7 into a circular chamber 27 that has a diameter smaller than groove 26 but larger than bore 25. This exposes the opposite edges 28 and 30 of the workpiece for machining operations. The central axes of bore 25, arcuate surface 7, and workpiece surfaces 5 and 6 are all coincident with central axis 20. Workpiece 2 may have a projecting portion such as tang 31, and there is a slot 32 in arcuate surface 7 for receiving such a projecting portion.

The means for moving or pivoting jaw 22 includes cylindrical hollow actuator means 35 that is centered in bore 25 and that slides axially in bore 25 along axis 20 as indicated in phantom at 33 in FIG. 2. Actuator 35 has a pair of identical opposed arms 36 that merge with a coaxial cylindrical ridge 38 on the outside of the actuator. Arms 36 and ridge 38 extend perpendicularly to bore 25 into a cavity 39 in body 10 that communicates with bore 25. Shafts 37 are held in arms 36, and each shaft supports a pair of identical cylindrical cam rollers 40 that are separated by a spacer. Pivotable jaw 22 is connected to one end 41 of rotatable shaft means 42 by a bolt 43, and shaft 42 is journaled in sleeve bearings 45 in a cylindrical hole 46 in body 10 that has its axis 47 parallel to axis 20. Shaft means 42 and jaw 22 are keyed to each other at 44. At an intermediate portion 48 of shaft 42 a pair of enlarged identical helical cam surfaces 49 mate with roller cams 40. Axial movement of actuator 35 in bore 25 and cavity 39, as indicated by arrow 50, causes cam rollers 40 to move along helical surfaces 49 and such movement rotates shaft 42 around axis 47. Rotation of shaft 42 causes jaw 22 to pivot with respect to axis 47.

Cylindrical end 51 of actuator 35 may be bolted to or threaded on to the threaded end 52 of a conventional hydraulically actuated cylindrical drawtube or drawbar 53 of a conventional lathe. Axial movement of drawbar 53 provides hydraulic force in the range of about 2,000–3,000 pounds for moving actuator 35, and the hydraulic force on drawbar 53 provides the force for holding the chuck parts and the workpiece 2 in place during the machining operations. As shown in FIG. 1, jaw 22 has been pivoted into contact with end 24 of workpiece 2. When workpiece 2 is to be removed from chuck 1, drawbar 53 advances actuator 35 axially along axis 20 toward the workpiece as indicated in phantom at 33. This movement rolls cams 40 along helical surfaces 49, which causes shaft 42 to pivot counterclockwise and move jaw 22 out of contact with the workpiece. In like manner, retraction of drawbar 53 toward the position shown in FIG. 1 moves actuator 35 away from the workpiece, and such movement rolls cams 40 over helical surfaces 49, and this movement rotates shaft 42 clockwise and pivots jaw 22 into contact with the workpiece as shown. Edge 54 of cavity 39 defines an abutment for limiting movement of actuator 35 by contact with ridge 38.

The other end 55 of shaft 42 is journaled for rotation in a bearing 56 fitted into a cavity 57 in an end plate 58 of chuck 1. End plate 58 is attached to body 10 by bolts 59. Chuck 1 may be held on a lathe by a spindle adapter 60 that is attached to body 10 by bolts 61. Suitable bolts that pass through bolt holes such as 62 that are aligned with mating holes on the lathe spindle 3 in conventional manner secure spindle adapter 60 to the lathe. Suitable gasketing such as at 63 may be provided to help retain lubricating fluids, and cradle portion 8 may have suitably located holes such as 64 for enabling machine tools to drill holes or slots such as oil access hole 65 in the workpiece.

Pads 16 and 21 may be identical, and, as shown in FIGS. 4 and 5, each pad has on one side a flat surface 68 for contacting an end 17 or 24 of the workpiece. A semicircular hump 69 on the opposite side of each pad fits into a mating semicircular groove 70 in an end of stop member 12 and pivotable jaw 22. Groove 70 provides a bearing surface supporting the mating surface of hump 69. A cylindrical shoulder bolt 71 defines shaft means that passes through a center hole in each pad, and bolt 71 threads into a tapped hole 72 in member 12 and jaw 22 for attaching the pads 16 and 21. Sufficient clearance is provided at 73 to permit rotation or pivoting of the pads. The top side of stop member 12 contacts an abuttment 75 that is attached to chuck body 10 by bolt 76. Abuttment 75 prevents movement or rotation of jaw assembly 9 when clamping force is applied to the workpiece 2 by pivoting jaw 22.

A locator clip 77 is held in a recess 78 in cradle portion 8. Recess 78 merges into groove 32, and the clip is held in place by a bolt 79 threaded into a tapped hole in the side of the clip. An integral spring arm 80 of clip 77 extends from recess 78 into contact with tang 31. An edge of arm 80 defines an edge of slot 32 in order to locate and hold workpiece 2 in its proper position for machining.

Our invention also includes methods for holding a circular arcuate workpiece 2 during machining operations on a lathe having a spindle 3. To load the workpiece into chuck 1, the workpiece is first placed in cradle 8 with its end 17 spaced from fixed jaw 12, as indicated at 66 in FIG. 1, and its convex surface 6 supported on concave surface 7 of the cradle. At this time jaw 22 would be pivoted to its open position as indicated in phantom in FIG. 1. Then while its surface 6 is supported on concave surface 7, workpiece 2 is slid along cradle 8 until one end 17 contacts an abuttment defined by pad 16. Workpiece 2 is then clamped securely in chuck 1 by exerting a clamping force on its ends by pivoting jaw 22 against the other end 24 of the workpiece. The clamping force may be a hydraulic force or pressure from drawbar 53.

It has thus been shown that by the practice of our invention a workpiece 2 may be a bearing half segment that is stably and securely held in a chuck 1 by a relatively simple mechanism using the conventional drawbar 53 of a lathe to move circular cam rollers 40 over helical surfaces 49 and thereby clamp the workpiece ends 17 and 24 between a stop member 12 and a pivoting jaw 22 of a removable jaw 9. This permits opposed edges 28 and 30 of the bearing to be exposed for machining and chamfering by extending edge 28 past the terminal edge 29 of the chuck and extending edge 30 past an edge of cradle portion 8 into chamaber 27. An oil groove 67 may be machined in concave surface 5 of bearing workpiece 2 and oil entry hole 65 may be drilled in the bearing without requiring that the workpiece be rechucked or repositioned in the chuck. When a workpiece of different size or shape is to be machined, it is only necessary to remove bolts 11 and replace jaw 9 with another jaw 9 having a cradle portion 8 with a suitably shaped surface 7 for supporting the new workpiece and an appropriately spaced stop member 12 and pivoted jaw 22. In the practice of our methods, the steps of sliding the workpiece along the supporting surface 7 until one end 17 is stopped by abuttment with fixed jaw 12 and tang 31, and/or flange 4, are in place, and then exerting a hydraulic clamping force against the other end 24 assures that the workpiece is accurately and securely held in place while it is rotated at high speed on a lathe as well as during other types of machining operations. Floating pads 16 and 21 assure that workpiece 2 is securely clamped in the chuck even though its ends 17 and 24 may be misaligned or uneven, and an edge of spring arm 80 of locator clip 77 pushes against tang 31 in slot 32 and assures accurate alignment of the workpiece for precise machining operations.

While our invention has been described with reference to a particular embodiment, it is not intended to illustrate or describe herein all of the equivalent forms or ramifications thereof. For example, workpiece 2 has been illustrated as being just slightly greater than 180 degrees in circumferential extent, but the workpiece held by our chuck could also be significantly greater than or slightly or significantly less than 180 degrees in circumferential length. Also, the words used are words of description rather than limitation, and various changes may be made without departing from the spirit or scope of the invention we have disclosed herein. We intend that the appended claims cover all such changes as fall within the true spirit and scope of our invention.

What we claim as new and desire to secure by Letter Patent of the United States is:

1. A chuck for holding a workpiece having a portion shaped like a circular arc that is less than 360 degrees, said chuck comprising a cradle portion having circular arcuate surface for supporting said workpiece, a stop member at one end of said cradle portion for abutting against one end of said workpiece when said workpiece is supported by said curcular arcuate surface, a jaw adjacent the other end of said cradle portion for clamping against the other end of said workpiece when said workpiece is supported by said circular arcuate surface, and means for moving said jaw into and out of contact with said other end of said workpiece.

2. The invention defined in claim 1, wherein there is a circular bore through said chuck with said chuck and said bore having coincident central axes.

3. The invention defined in claim 2, wherein said circular arcuate surface has its central axis coincident with said central axes, and said circular arcuate surface has a predetermined diameter.

4. The invention defined in claim 3, wherein one edge of said workpiece extends beyond a terminal edge of said chuck, and an opposite edge of said workpiece extends beyond said circular arcuate surface into said bore, whereby such opposed edges of said workpiece are exposed for machining.

5. The invention defined by claim 1, wherein said workpiece comprises a projecting portion that extends beyond said circular arc, and there is a slot in said arcuate surface for receiving said projecting portion.

6. The invention defined in claim 5, further comprising spring means contacting said projecting portion in said slot for locating said workpiece in said chuck.

7. The invention defined in claim 1, wherein said means for moving said jaw comprises a helical cam surface.

8. The invention defined in claim 1, wherein said circular arc of said workpiece is greater than 180 degrees.

9. The invention defined in claim 1, wherein said circular arc of said workpiece is less than 180 degrees.

10. The invention defined in claim 1, wherein said means for moving said jaw comprises actuator means centered in said bore and movable axially in said bore, said actuator means having a cam surface for pivoting said jaw.

11. The invention defined in claim 10, wherein said cam surface comprises a plurality of rollers.

12. The invention defined in claim 11, wherein said jaw is connected to rotatable shaft means centered on its axis of pivoting, and said shaft means has a helical cam surface mating with said rollers.

13. The invention defined in claim 1, wherein said means for moving said jaw comprises actuator means centered in said bore and slidable axially in said bore, said actuator means having a pair of arms extending perpendicularly to said bore, each of said arms supporting a pair of roller cams, said jaw being pivotable and being connected to rotatable shaft means that is centered on its axis of pivoting, and said shaft means having a pair of helical cam surfaces that mate with the pairs of roller cams on said arms in such a manner that axial movement of said actuator means pivots said jaw into and out of contact with said other end of said workpiece.

14. The invention defined in claim 13, wherein said bore communicates with a coaxial cavity in said chuck, said actuator means has a coaxial outer ridge that extends into said cavity, and said arms merge with said ridge in said cavity.

15. A chuck for holding a workpiece having a portion shaped like a concave circular arc that is substantially less than 360 degrees and is unequal to 180 degrees, said workpiece having a projecting portion that extends beyond said arc, said chuck comprising a cradle portion having a concave circular arcuate surface for supporting said workpiece, said circular arcuate surface having a predetermined diameter, there being a circular bore of predetermined diameter through said chuck, with said chuck and said bore and said circular arcuate surface having coincident central axes, a stop member at one end of said cradle portion for abutting against one end of said workpiece when said workpiece is supported by said circular arcuate surface, said stop member extending generally radially of said circular arcuate surface, a pivoted jaw adjacent the other end of said cradle portion for clamping against the other end of said workpiece when said workpiece is supported by said circular arcuate surface, and means for pivoting said jaw into and out of contact with said other end of said workpiece comprising actuator means centered in said bore and movable axially in said bore, said actuator means having a cam surface comprising a plurality of rollers, said pivotable jaw being connected to rotatable shaft means that is centered on its axis of pivoting, said axis of pivoting being parallel to said central axes, said shaft means having a helical cam surface mating with said rollers, there being a slot in said arcuate surface of said crade portion for receiving said projecting portion of said workpiece, and spring clip means contacting said projecting portion in said slot for locating said workpiece in said chuck, and one edge of said workpiece extending beyond a terminal edge of said chuck, and an opposite edge of said workpiece extending beyond said circular arcuate surface into a chamber having a diameter larger than said diameter of said bore, whereby such opposed edges of said workpiece are exposed for machining.

16. A removable jaw for a chuck for holding a workpiece shaped like a circular arc that is less than 360 degrees comprising a circular arcuate cradle portion for supporting said workpiece, a stop member at one end of said cradle portion, said stop member having a rotatable pad for abutting against one end of said workpiece when said workpiece is supported by said cradle portion, a movable jaw adjacent the other end of said cradle portion, said movable jaw having a rotatable pad for clamping against the other end of said workpiece when said workpiece is supported by said cradle portion, whereby a workpiece can be securely held in said jaw between said rotatable pads when said ends are misaligned.

17. The invention defined in claim 16, wherein each of said pads comprises a semi-circular hump that mates with a semicircular depression at the end of its associated stop or jaw.

18. The invention defined in claim 17 wherein each of said pads comprises shaft means that extends into a hole in its associated stop or jaw.

19. A method for stably holding during machining, a workpiece that includes a circular arcuate portion that is less than 360 degrees and has a concave surface and a convex surface, comprising the steps of supporting said convex surface on a concave circular arcuate cradle, sliding said convex surface along said arcuate cradle while said workpiece is supported by said arcuate cradle until one end of said workpiece contacts an abutment, and clamping said workpiece in said arcuate cradle by moving a jaw against the other end of said workpiece.

20. The invention defined in claim 19, further comprising pivoting said jaw against said other end of said workpice.

21. The invention defined in claim 20, further comprising pivoting said jaw by hydraulic pressure.

* * * * *